United States Patent [19]

Suzuki et al.

[11] Patent Number: 5,569,494
[45] Date of Patent: Oct. 29, 1996

[54] METHOD FOR HIGH-SPEED APPLICATION OF A COATING WHILE ADJUSTING THE COAT THICKNESS

[75] Inventors: Akihiro Suzuki; Norio Shibata; Shinsuke Takahashi; Mikio Tomaru, all of Kanagawa, Japan

[73] Assignee: Fuji Photo Film Co., Ltd., Kanagawa, Japan

[21] Appl. No.: 306,328

[22] Filed: Sep. 15, 1994

[30] Foreign Application Priority Data

Oct. 20, 1993 [JP] Japan .................................. 5-284125

[51] Int. Cl.$^6$ ..................................................... B05D 3/12
[52] U.S. Cl. ........................... 427/358; 427/129; 427/131; 427/356; 118/410; 118/411
[58] Field of Search ...................................... 427/129, 131, 427/356, 358; 118/410, 411

[56] References Cited

U.S. PATENT DOCUMENTS 4,907,530 3/1990 Shibata et al. ........................... 118/410
5,153,033 10/1992 Shibata et al. ........................... 427/356
5,348,768 9/1994 Shibata et al. ........................... 427/356

*Primary Examiner*—Katherine Bareford
*Attorney, Agent, or Firm*—Sughrue, Mion, Zinn, Macpeak & Seas

[57] ABSTRACT

A method of applying a coating fluid 5 with a coating head 1 having a front edge 3 and a back edge 4 receding in a direction opposite to the support from the front edge in a liquid seal state with a precoat fluid 7 of low viscosity consisting essentially of an organic solvent previously applied to the application face of the support 2. The coating fluid 5 is spouted from a slot at the rear of the front edge while the coat thickness of the precoat fluid is adjusted by setting the run speed of the support to 400 m/min or higher, the curvature R (mm) of the top surface of the front edge as a curved surface to $1 \leq R \leq 5$, tension of the support, T (kg/m), to $10 \leq T \leq 30$, and the incidence angle of the support on the front edge, $\alpha$, to the range of $-0.5°$ to $2°$.

6 Claims, 4 Drawing Sheets

METHOD FOR HIGH-SPEED APPLICATION OF A COATING WHILE ADJUSTING THE COAT THICKNESS

BACKGROUND OF THE INVENTION

This invention relates to an application method of a coating fluid and more particularly to an application method using an extrusion type coating head for applying a uniform coating of fluid extruded from a slot end to the surface of a flexible support consecutively running in support of run guide means such as guide rollers with the coating head nose directed toward the flexible support surface.

Hitherto, a step of applying a desired coating fluid to the surface of a flexible support has been executed in a manufacturing process of photo-sensitive material, magnetic recording media, etc. Coating fluids containing various fluid compositions are available according to their applications, for example, coating fluids of photo-sensitive emulsion coats, undercoats, protective coats, back coats, etc., in photo-sensitive material and those of magnetic coats, undercoats, protective coats, lubricant coats, etc., in magnetic recording media. The coating fluids are aqueous and organic solvent solutions, etc., containing their indispensable components, binders, and various admixtures as required.

Hitherto, various application methods, such as a roll coat method, a gravure coat method, a roll coat plus doctor method, extrusion type application method, and slide coat method, have been used as methods of applying such coating fluids to the flexible support surface. In recent years, the application method using an extrusion type coating head has been often used for applying a magnetic coating fluid.

A typical method using an extrusion type coating head is, as well known, a method of applying a thin and uniform coating of fluid extruded from the slot end to the surface of a flexible support consecutively running with the coating head disposed between a pair of run guide means spaced at a given distance apart at a predetermined place on which the flexible support is placed.

The method using the extrusion type coating head includes, for example, a so-called pressurizing type application method of directing the nose of a coating head, namely, the top of the front edge and back edge (doctor edge) defining a slot from which a coating fluid is extruded toward the surface of a flexible support mounted on a pair of run guide means, guide rollers and consecutively running in support of the guide rollers so as to press it against the flexible support surface and changing the space between the nose and the flexible support surface in response to a change in the extrusion amount of the coating fluid for applying the coating fluid under pressure to the flexible support surface.

To solve disadvantages of the pressurizing type application method, such as being easily affected by uneven thickness of the support and an unstable state in which behavior of coating fluid is easily placed out of order by coating fluid pressure, a method as disclosed in U.S. Pat. No. 4,907,530 was proposed, wherein, as shown in FIG. 4, a coating head 1 has a slot 6 extending from a fluid reservoir 8 to the coating head nose, an edge face 30 of a front edge 3 is curved so as to swell toward the side of a flexible support 2, and the tip 41 of an edge face 40 of a back edge 4 recedes from the end 31 of the front edge face with a level difference in the direction opposite to the flexible support. Therefore, the edge face 40 of the back edge 4 enables a coating fluid 5 extruded from the slot 6 to be applied to the support in a natural flow without being pressed against the support side. That is, foreign material such as accompanying dust particles adhering to the support are not trapped on the edge face 40 of the back edge 4 and air is not involved in the support either, thereby enabling high speed application and efficiently preventing "vertical stripes" along the running direction of the support from occurring on the coat.

According to the non-pressurizing type application method, a thin coating can be applied as doctor blade type application, but the method requires improvement to meet demands for high speed, thin coating, and high density and moreover stable mass application.

Then, further research shows that high speed thin coat application performance of a coating fluid applied to a precoat depends greatly on the precoat thickness at extremely high speed application.

However, hitherto, the precoat fluid thickness has been controlled almost depending on experience. A problem remains unsolved on stable application at thin coating application at high speed such as 400 m/min or higher. As a result of intensive research, a problem hindering high speed thin coating application due to film cut of a coating fluid in relation to coating conditions has been highlighted to advance high speed thin coating application.

SUMMARY OF THE INVENTION

It is therefore an object of the invention to provide an application method for suppressing film cut at high speed thin coat application and preventing a coat thickness change in the width direction of the support or stripes from occurring due to unevenness in the width direction of the support for manufacturing products uniform in coating thickness, particularly, high-density magnetic recording media good in electro-magnetic conversion characteristic at high speed and as thin coating stably.

To the end, according to the invention, there is provided a method of applying at least one or more types of coating fluid for forming at least one or more coats on a solvent application face in such a manner of pressing against a support placed on guide rollers with an extrusion type head having a front edge positioned in an upstream with respect to a support move direction and a back edge positioned in a downstream with respect to the support move direction and having an acute-angle tip receding in a direction opposite to the support with a level difference from the front edge in a liquid seal state with a precoat fluid of low viscosity consisting essentially of an organic solvent previously applied to the application face of the support, the method comprising the step of applying the coating fluid in a manner of spouting it from a slot at the rear of the front edge while adjusting the coat thickness of the precoat fluid by setting the run speed of the support to 400 m/min to 1,000 m/min, the curvature R (mm) of the top surface of the front edge as a curved surface to $1 \leq R \leq 5$, tension of the support, T (kg/m), to $10 \leq T \leq 30$, and the incidence angle of the support on the front edge, $\alpha$, to the range of $-0.5°$ to $2°$.

DESCRIPTION OF THE PREFERRED EMBODIMENTS

Referring now to the accompanying drawings, there are shown preferred embodiments of the invention.

Figure 1:
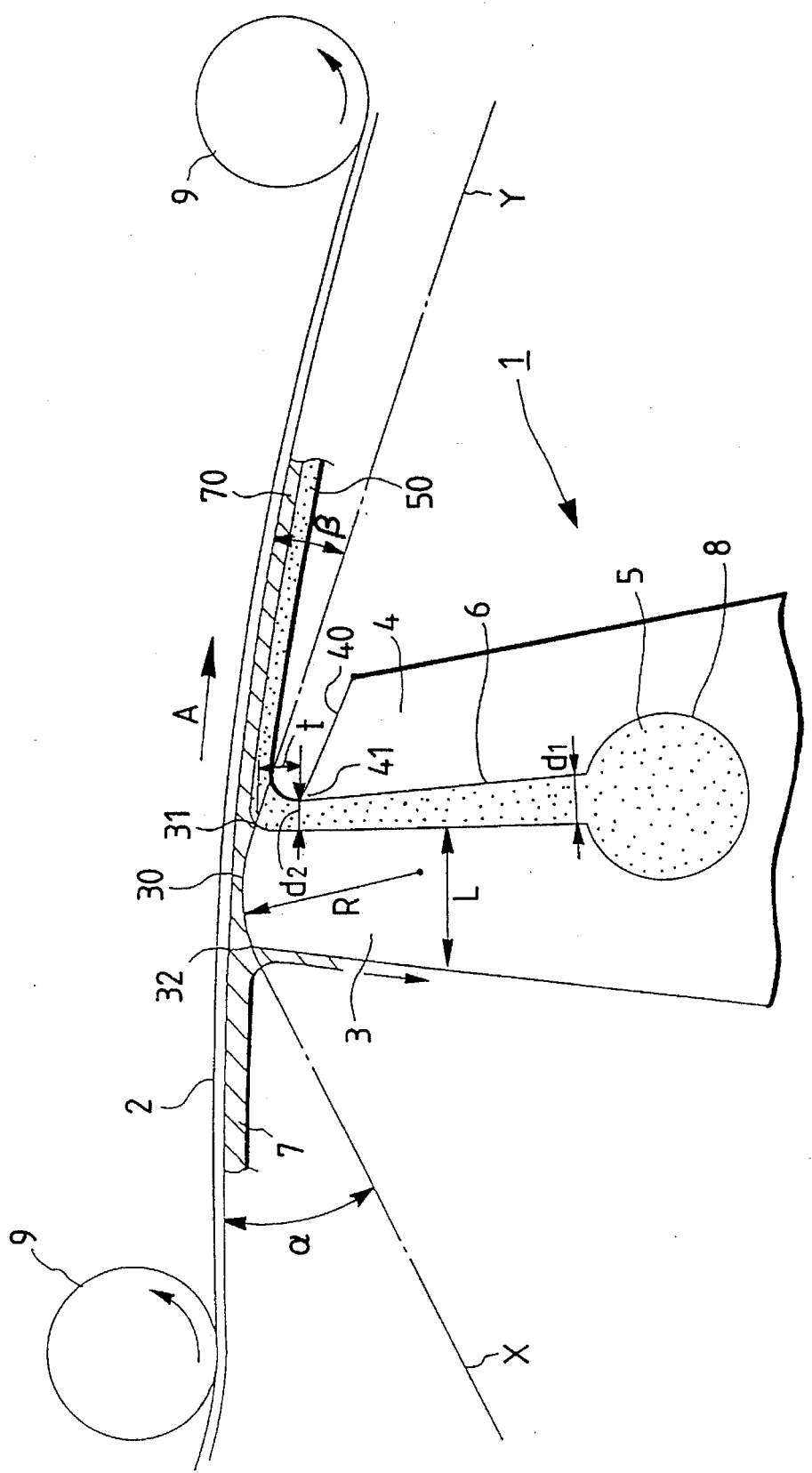
FIG. 1 is a schematic drawing of main parts of a coating head for carrying out an application method of the invention.

FIG. 1 is a sectional view of main parts of a non-pressurizing coating head 1 used for an extrusion type application method when the coating head is located so as to press against a support 2 in an application step of a magnetic dispersion fluid forming a magnetic recording coat as a coating fluid.

The main parts of the coating head 1 shown in FIG. 1 include a fluid reservoir 8 to which a coating fluid is supplied from a fluid supply channel (not shown), a slot 6, a front edge 3, and a back edge 4, and guide rollers 9 and 9 are disposed before and after the coating head 1.

As shown in FIG. 1, the fluid reservoir 8 is a fluid reservoir portion which has a section substantially like a circle and is extended with substantially the same sectional form in the width direction of the support 2.

Normally, the effective extension length is set equally to or slightly longer than the coating width.

The inner diameter of the fluid reservoir 8 is not limited; for example, it can be set to 10–50 mm. The through openings at both ends of the fluid reservoir are closed by proper shield plate installed on both ends of the coating head 1.

The slot 6 is provided with a proper taper so as to narrow the slot width from the fluid reservoir 8 to the support 2 or from the fluid reservoir side to the slot exit side; the liquid reservoir side width of the slot 6, d1, is, for example, 0.1–5 mm and the slot exit width, d2, is 0.02–0.3 mm. It is a comparatively narrow route passed through the inside of the coating head 1 and extended in the width direction of the support 2 as with the liquid reservoir 8. The opening length in the width direction of the support 2 is set substantially equal to the coating width.

The length of the flow route of the slot 6 directed toward the side of the support 2 is set appropriately by considering the liquid composition, substance properties, supply flow amount, supply pressure, etc., of a coating fluid 5; it needs only to enable the coating fluid 5 to flow like a laminar flow in a uniform flow amount and on uniform hydraulic pressure in the width direction of the support 2 from the fluid reservoir 8. A surface of back edge 4 along slot 6 forms an acute-angle with a top surface of back edge 4, as shown in FIG. 1.

The exit tip of the slot 6 is formed so as to provide a level difference t by the front edge 3 and the back edge 4 (described below) positioned on the upstream and downstream sides of the support 2 respectively.

The front edge 3 is positioned upstream of the support 2 from the spout of the slot 6 and projects about 0.01–5.0 mm toward the support 2 as compared with the back edge 4 disposed downstream, forming the level difference t.

Further, preferably, the curvature R of the entire edge face of the front edge 3 opposed to the support 2 is set in the range of about 1.0 mm to 5.0 mm, with a preferred range of 1.5 mm to 3.0 mm.

The width of the front edge 3, L, can be made, for example, about 0.5 mm to 5 mm.

With the coating head 1 described above, when the support 2 mounted in substantially constant tension and in a slightly curvable state in the thickness direction between run guide means such as the guide rollers 9 is made to approach via an extruder support mechanism (not shown) so that it is curved in substantially parallel to the entire edge face from the tip 32 of the front edge 3 to the rear end 31 and sending the coating fluid 5 is started in a desired flow amount from the fluid supply channel, the coating fluid 5 is passed through the fluid reservoir 8 and the slot 6, then is extruded to the exit tip of the slot 6 in a uniform flow amount and pressure distribution in the width direction of the support 2.

On the other hand, a precoat fluid 7 compatible with the coating fluid 5 in some degree is previously applied to the surface of the support 2 and a part of the precoat fluid 7 is scraped away by the front edge 3, thereby preventing accompanying air from being involved when the coating fluid 5 is applied and improving application concordance when a coating of the coating fluid 5 is applied because a precoat 70 remains after the precoat fluid is scraped away. The thickness of the precoat 70 can be controlled by appropriately setting conditions described below; of the conditions, how to lap the support 2 is a large factor.

If with a tangent X drawn from the tip 32 of the front edge 3 as a reference line, the angle $\alpha$ (angle of incidence) when the support 2 passes through the side above the tangent X is defined as plus angle setting and the angle $\alpha$ when the support 2 passes through the side below the tangent X is defined as minus angle setting, a good result can be produced when the angle $\alpha$ is set in the range of $-0.5°$ to $2°$, preferably $0°$ to $2°$, in relation with other conditions (described below).

In the application step, the coating fluid 5 extruded to the exit tip of the slot 6 flows out to the edge face of the back edge 4 opposed to the support 2 with a gap substantially equal to the level difference t without contacting the surface of the support 2 on large hydraulic pressure, namely, without action so as to push up the support surface by spout hydraulic pressure. Then, the coating fluid 5 is spread out along the surface of the support 2 consecutively moving in the arrow A direction in FIG. 1 as it is pulled so as to get to fit the precoat 70.

The entire edge face of the front edge 3 and the surface of the support 2 are separated with a constant gap by the precoat 70 involved between the edge face and the support over the entire area in the width direction thereof.

The coating thickness of the coating fluid 5 is determined by setup conditions such as the tension of the support 2, the supply amount of the coating fluid 5 (hydraulic pressure), and support running speed. Particularly, a desired coating thickness can be provided extremely easily and accurately by changing the setting of only the supply amount of the coating fluid 5.

Thus, the coating fluid 5 applied with the coating head 1 is applied with a desired space with the edge face of the back edge 4 in the gap between the support 2 and the back edge 4, whereby the problem of vertical stripes caused by foreign material, etc., trapped on the edge as with the pressurizing type coating head can be avoided effectively. If the thickness of the support 2 or Young's modulus changes, behavior of the coating fluid 5 does not become unstable under pressure unlike the structure where the edge face of the pressurizing type coating head causes the coating fluid 5 to be spread out on the support. This fact is also considered a source for improving the application performance. The changes can be dealt with sensitively by the spout pressure, providing extremely uniform coating thickness.

The precoat fluid having low viscosity consisting essentially of an organic solvent in the invention is a fluid of an organic solvent such as toluene, methyl ethyl ketone, butyl acetate, or cyclohexanone or a fluid of a combination thereof or a solution of a binder in the fluid. The static viscosity is 20 cp or less and preferably 5 cp or less.

At least one or more coats contain magnetic coat only, double magnetic coats, and a combination of magnetic and nonmagnetic coats containing at least one magnetic coat for magnetic recording media. Other than magnetic recording media, likewise, known coat structures are possible.

The coating head 1 is installed between two guide rolls 9 as shown in FIG. 1, or coating equipment for applying a precoat fluid can be installed in just upstream of the upstream guide roll 9, for example. The lap angle in downstream of the support 2 at the coating head 1, $\beta$, is not limited; it can be set to about 2°–60° with a tangent Y drawn from the rear end 31 as reference. Further, the span of the guide rollers 9 at the coating head 1 generally can be set to about 50–3000 mm, but is not limited to it.

For the liquid sending channel, known techniques are used in response to the coating fluid properties. Particularly, a magnetic coating fluid has a coagulation property, thus it is desirable to shear in such a degree that it does not aggregate. Specifically, techniques disclosed in Unexamined Japanese Patent Laid-Open Application No.Hei. 1-236968, U.S. Pat. No. 4,828,779, etc. To use the structure with no rotors shown in the Unexamined Japanese Patent Laid-Open Application No.Hei. 1-236968, etc., the piping diameter between a pump and coating head can be set to 50 mm or less, the diameter of the fluid reservoir of the coating head to about 2–20 mm, the slit width of the coating head to about 0.05–1 mm, and the slit length to about 5–150 mm, but not limited to the ranges.

The coating head used for carrying out the invention is not limited to the form for single coat application as shown in FIG. 1 and the invention can also be applied to a coating head capable of applying two or more coats at the same time, needless to say.

The curvature R of the front edge 3 should be 1–5 mm. If the curvature R is greater than 5 mm, the fluid amount passed through the front edge 3 at high speed application of 400 m/min or higher may increase, adversely affecting fluid behavior at coating with the coating fluid 5; cost is increased and the risk of causing face fault in drying process is raised. If the curvature R is less than 1 mm, the thickness in the area of the front edge 3 becomes too thin, thus a scratch or the like is easily caused and it is very difficult to grind while maintaining face precision so as not to produce unevenness.

The tension of the support 2 generally is 5–40 kg/m. In the invention, however, if it is 30 kg/m or more, the fluid amount passed through the front edge 3 is too reduced, thus it becomes disadvantageous for thin coat application and is not desirable. On the other hand, if the tension is 10 kg/m or less, because the support running speed is fast, behavior when the support 2 runs is prone to become unstable and it is difficult to handle the support 2. Preferred range of the tension is 15 to 30 kg/m. Considering conditions such as the coating speed and the curvature and form of the front edge 3, by advancing in lap state in the range of −0.5° to 2° of the incidence angle α, the gap between the support 2 and the front edge 3 can be adjusted for delicately controlling the passed fluid amount.

That is, as the incidence angle α of the support 2 increases, the thickness of the precoat 70 increases. When the lap angle is changed from large to small angle, the coating amount is liable to change suddenly at near 0 due to the effect of the tip 32. The coating amount of the precoat 70 increases in rough proportion to the value of the curvature R of the front edge 3. This is because it is considered that the hydraulic pressure at the front edge tip becomes inversely proportional to the curvature R if the flexural rigidity of the support 2 can be ignored.

Further, as the tension of the support 2 increases, the coating amount of the precoat 70 decreases because the hydraulic pressure at the tip 32 increases as the tension increases like the value of the curvature R of the front edge 3.

For the pass amount of the precoat fluid when the coating speed is changed, if the fluid amount provided by the precoat fluid 7 is less than it, no scrape out is performed and a complete liquid seal state is not entered, but some amount of the proportional relationship between the thickness of the precoat 70 and the coating speed is established.

When a condition in which application of the coating fluid 5 accompanied by air can be performed is measured by changing the coating speed, the area in which the coating fluid can be applied is extended as the coating speed is accelerated; particularly, it is advantageous for thin coat application.

In the invention, the lap angle of the support 2 to the coating head 1 can be set appropriately for adjustment by moving the coating head 1 or the guide rollers 9.

As described above, in the application method of the invention, when a coat is formed on the solvent coat face in such a manner of pressing against the support placed on the guide rollers with the non-pressurizing extrusion type coating head, the coating fluid is spouted from the slot at the rear of the front edge while the coat thickness of the precoat fluid is adjusted by setting the run speed of the support to 400 m/min to 1,000 m/min, the curvature R (mm) of the top surface of the front edge as a curved surface to $1 \leq R \leq 5$, the tension of the support, T (kg/m), to $10 \leq T \leq 30$, and the incidence angle of the support on the front edge, α, to the range of −0.5° to 2°. Therefore, film cut can be suppressed at high speed thin coat application and a coat thickness change in the width direction of the support or stripes can be prevented from occurring due to unevenness in the width direction of the support for manufacturing products uniform in coating thickness, particularly, high-density magnetic recording media good in electro-magnetic conversion characteristic at high speed and as thin coating stably.

Example

The invention will be more clearly with reference to the following example:

Components in the composition listed in Table 1 were put into a ball mill and fully mixed and dispersed, then 30 parts by weight of epoxy resin (epoxy equivalent 500) were added and uniformly mixed and dispersed to generate a magnetic coating fluid (magnetic dispersion fluid).

When the viscosity of the magnetic coating fluid thus obtained was measured with a Rotovisko viscometer, a thixotropic viscosity characteristic was shown at each shear speed.

Methyl isobutyl ketone was used for precoat fluid.

Next, the coating fluid was applied by using the following coating equipment under the following conditions:

1) Support (nonmagnetic)
   Material: Polyethylene terephthalate film
   Thickness: 15 microns
   Width: 500 mm
   Tension: 2.5–20 kg/full width (equivalent to 5–40 kg/m)
2) Precoat of fluid having low viscosity
   Precoat was applied as thickness 2.0–6.0 μm (wet condition) in a bar coater application system.
3) Coating head
   In the configuration based on the coating head shown in FIG. 1, the curvature R of the front edge was set to 1.0–10 mm, the incidence angle to −2° to 4°, and the front edge width L to 0.5–3.3 mm corresponding to the curvature R. The level difference between the front edge and the back edge, t, was set to 50 μm.
4) Coat thickness: 15 μm (wet condition)
5) Coating speed: Is changed in the range of 400–800 m/min The application results are shown in Tables 2 and 3 and FIGS. 2 and 3. The mark o in the tables denotes that a good coat free of uneven coating, stripes, etc., can be formed; Δ denotes that slight uneven coating or stripes occurred although there was no problem on practical use, and x denotes that uneven coating and stripes occurred frequently.

TABLE 1

| | |
|---|---|
| γ-Fe2O3 powder (needle-like particles having | 300 parts by weight |

TABLE 1-continued

| | |
|---|---|
| average particle diameter 0.5μ in major axis direction, anti-magnetic force 320 oersted) | |
| Vinyl chloride-vinyl acetate copolymer (copolymer ratio 87:13, polymerization degree 400) | 30 parts by weight |
| Conductive carbon | 20 parts by weight |
| Polyamide resin (amine valence 300) | 15 parts by weight |
| Lecithin | 6 parts by weight |
| Silicone oil (dimethyl polysiloxane) | 3 parts by weight |
| Xylol | 300 parts by weight |
| Methyl isobutyl ketone | 300 parts by weight |
| n-butanol | 100 parts by weight |

TABLE 2

| Precoat amount: wet thickness μm | Coating speed m/min | Curvature R (mm) | Tension T kg/m | Incidence angle α(°) | Application result | Scrape out | Film cut | Remarks |
|---|---|---|---|---|---|---|---|---|
| 2.0 | 400 | 3.0 | 20 | 0 | Δ | ο | Δ | Partial film cut signs |
| 2.0 | 600 | 3.0 | 20 | 0 | x | x | x | Film cut because of no liquid seal |
| 2.0 | 800 | 3.0 | 20 | 0 | x | x | x | Film cut because of no liquid seal |
| 3.0 | 400 | 3.0 | 20 | 0 | Δ | ο | Δ | Partial film cut signs |
| 3.0 | 600 | 3.0 | 20 | 0 | ο | ο | ο | |
| 3.0 | 800 | 3.0 | 20 | 0 | x | x | x | Film cut because of no liquid seal |
| 4.0 | 400 | 3.0 | 20 | 0 | Δ | ο | Δ | Partial film cut signs |
| 4.0 | 600 | 3.0 | 20 | 0 | ο | ο | ο | Standard type |
| 4.0 | 800 | 3.0 | 20 | 0 | ο | ο | ο | |
| 4.0 | 600 | 1.0 | 20 | 0 | Δ | ο | Δ | Partial film cut signs |
| 4.0 | 600 | 1.5 | 20 | 0 | ο | ο | ο | |

TABLE 3

(Continued Table 2)

| Precoat amount: wet thickness μm | Coating speed m/min | Curvature R (mm) | Tension T kg/m | Incidence angle α(°) | Application result | Scrape out | Film cut | Remarks |
|---|---|---|---|---|---|---|---|---|
| 4.0 | 600 | 5.0 | 20 | 0 | ο | ο | ο | |
| 4.0 | 600 | 10.0 | 20 | 0 | Δ | Δ | Δ | Partial film cut signs |
| 6.0 | 600 | 10.0 | 20 | 0 | Δ | ο | ο | Coat face fault/thick precoat application |
| 4.0 | 600 | 3.0 | 5 | 0 | x | Δ | Δ | Coat face fault caused by insufficient tension |
| 4.0 | 600 | 3.0 | 10 | 0 | ο | ο | ο | |
| 4.0 | 600 | 3.0 | 30 | 0 | ο | ο | ο | |
| 4.0 | 600 | 3.0 | 40 | 0 | x | ο | x | Coat cut |
| 4.0 | 600 | 3.0 | 20 | −2 | x | ο | x | Coat cut |
| 4.0 | 600 | 3.0 | 20 | −0.5 | ο | ο | ο | |
| 4.0 | 600 | 3.0 | 20 | 2 | ο | ο | ο | |
| 4.0 | 600 | 3.0 | 20 | 4 | Δ | ο | ο | Some stripes caused by foreign material |

Figure 2:
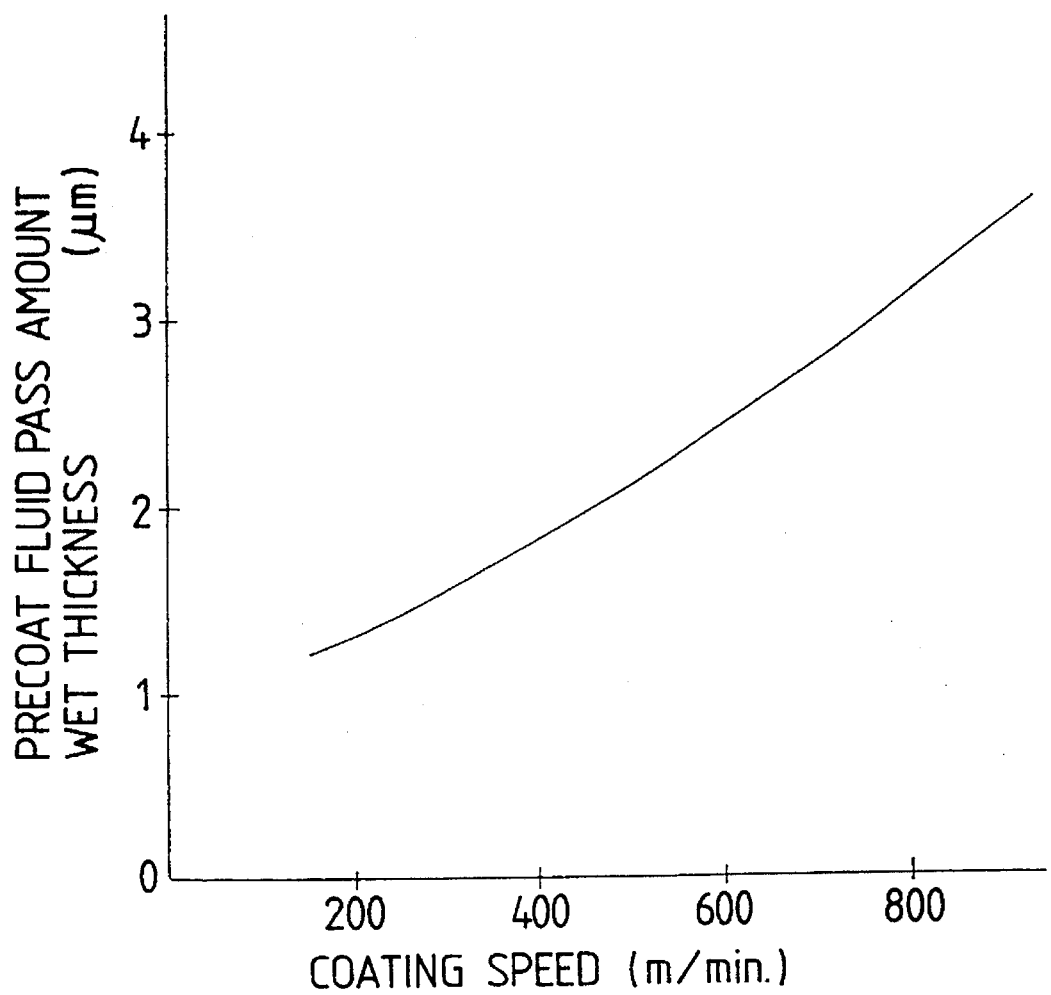
FIG. 2 is a graph showing the relationship between the coating speed and precoat thickness.

FIG. 2 shows the pass amount of the precoat fluid when the coating speed was changed. If the actually precoated fluid amount is less than it, no scrape out is performed, thus a complete liquid seal state is not entered.

As seen together with the results in Tables 2 and 3, coat cut sometimes occurred under a condition with no scrape out, and stable application cannot be performed. Under a condition with scrape out, if the application condition of the coating fluid is in the area in which the coating fluid can be applied, stable application can be performed and good coating face was formed by adjusting the coat thickness of the precoat fluid with the run speed of the support set to 400 m/min or higher, the curvature R (mm) of the top surface of the front edge as a curved surface set to $1 \leq R \leq 5$, the tension of the support, T (kg/m), set to $10 \leq T \leq 30$, and the incidence angle of the support on the front edge, α, set to the range of −0.5° to 2°.

Figure 3:
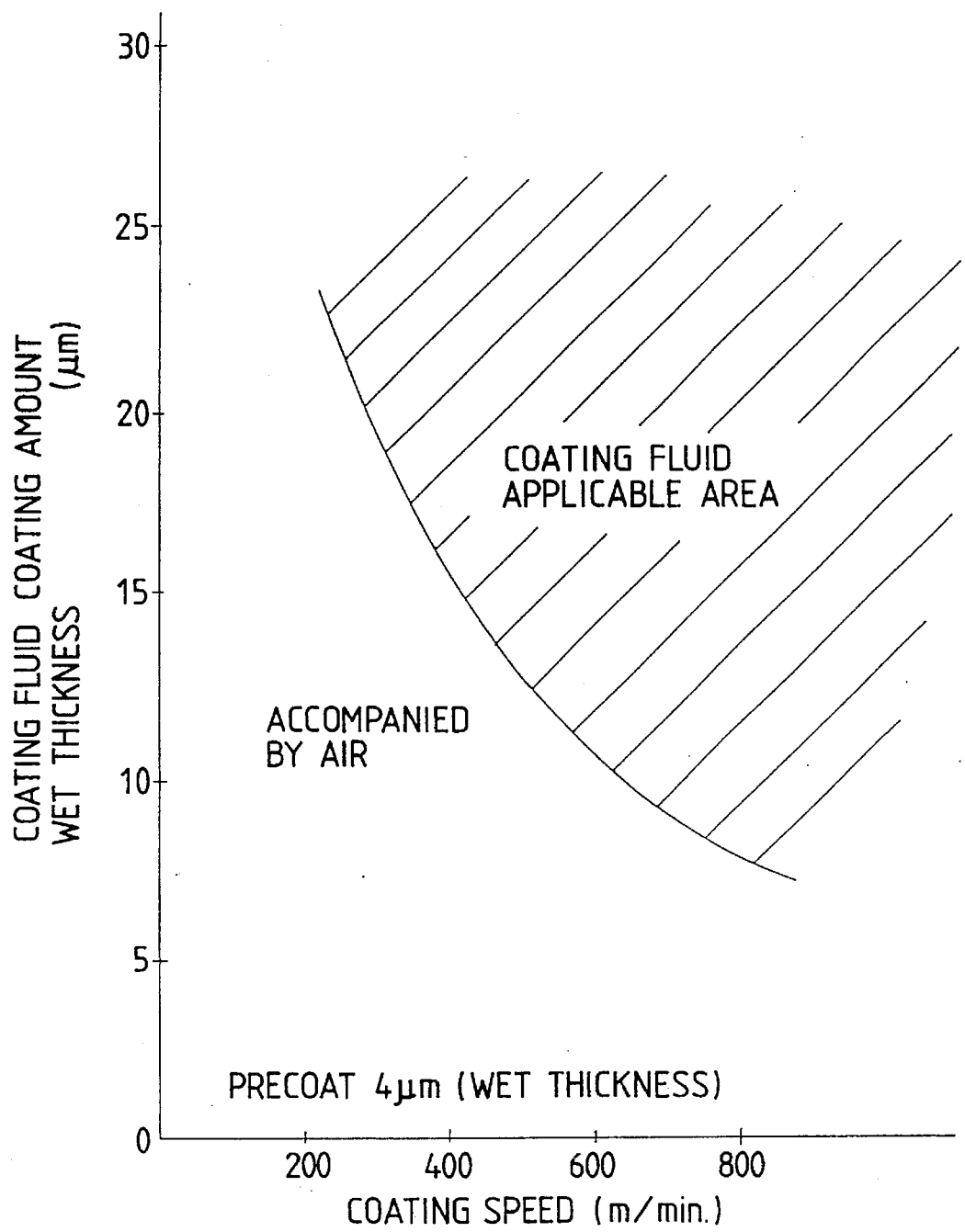
FIG. 3 is a graph showing the area in which coating fluid accompanied by air can be applied in relation with the coating speed and coating thickness.
Figure 4:
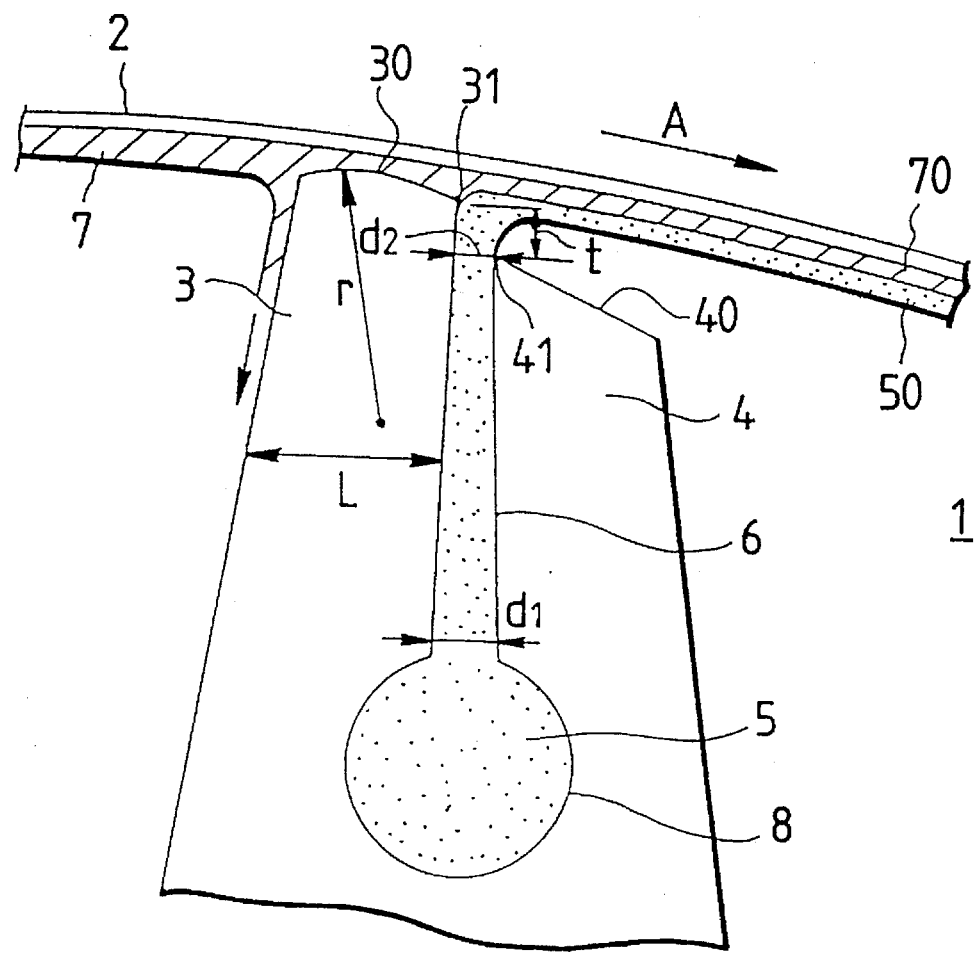
FIG. 4 is a schematic drawing showing a non-pressurizing type coating head.

When the condition in which application of the coating fluid 5 accompanied by air can be performed was observed by setting the precoat thickness to 4 μm, the area in which the coating fluid can be applied when the coating speed was changed was extended as the coating speed was accelerated, as shown in FIG. 3; particularly, it was advantageous for thin coat application.

What is claimed is:

1. A method of applying one or more coating fluids to a face of a support using a non-pressurized head having a front edge and a rear edge disposed adjacent to the front edge, forming a slot therebetween, the rear edge having a top side opposite the support and a slot side along said slot meeting the top side forming an acute-angle tip, the acute-angle tip being receded from the front edge top side in a direction opposite the support, the method comprising the steps of:

placing a non-pressurized coating head against the face of the support;

setting a tension T of the support within a range of 10 kg/m ≤ T ≤ 30 kg/m;

setting a lap angle α, where α is an angle between the support and a line tangent to a forward most tip of the front edge of the non-pressurized coating head, within a range of $-0.5°\leq\alpha\leq 2°$;

setting a curvature R of the front edge within a range of $1\ mm\leq R\leq 5\ mm$;

setting a speed of the support to 400 m/min or higher;

applying a precoating solution to the face of the support at a position upstream from the front edge with respect to a movement of the support; and applying the one or more coating fluids extending from the slot to the face of the support at a position between the front and rear edges with respect to the movement of the support, wherein said placing step is performed such that said coating fluids do not contact said top side of the rear edge.

2. A method according to claim 1, further comprising the step of adjusting a thickness of the coat applied to the support by controlling a supply amount of the one or more coating fluids.

3. A method according to claim 1, wherein the precoat solution is comprised of an organic solvent and has a viscosity of 20 cp or less.

4. A method according to claim 3, wherein the precoat solution is one of toluene, methyl ethyl ketone, butyl acetate, cyclohexanone and a combination thereof.

5. A method according to claim 1, in which the step of setting a tension T is performed by adjusting a position of a guide roller disposed along said support.

6. A method according to claim 1, in which the step of setting a lap angle $\alpha$ is performed by adjusting a position of the non-pressurized coating head.

* * * * *